United States Patent
Findakly et al.

(12)
(10) Patent No.: US 6,504,961 B1
(45) Date of Patent: Jan. 7, 2003

(54) POLARIZATION MAINTAINING OPTICAL COUPLER

(75) Inventors: Talal K. Findakly, Hackettstown, NJ (US); Jan W. Kokkelink, Blairstown, NJ (US)

(73) Assignee: Micro-Optics, Inc., Hackettstown, NJ (US)

( * ) Notice: Subject to any disclaimer, the term of this patent is extended or adjusted under 35 U.S.C. 154(b) by 0 days.

(21) Appl. No.: 09/804,540

(22) Filed: Mar. 12, 2001

Related U.S. Application Data

(60) Provisional application No. 60/188,877, filed on Mar. 13, 2000.

(51) Int. Cl.[7] .................................................. G02B 6/00
(52) U.S. Cl. ....................................................... 385/11
(58) Field of Search ............................... 385/11, 16, 34, 385/196, 36, 39, 40, 33

(56) References Cited

U.S. PATENT DOCUMENTS

| | | | | |
|---|---|---|---|---|
| 5,321,251 A | * | 6/1994 | Jackson et al. | 385/11 |
| 5,402,509 A | * | 3/1995 | Fukushima | 385/11 |
| 5,459,578 A | * | 10/1995 | Park et al. | 356/374 |
| 5,740,288 A | * | 4/1998 | Pan | 385/11 |
| 5,982,539 A | * | 11/1999 | Shirasaki | 385/11 |

FOREIGN PATENT DOCUMENTS

JP   360120271   *   6/1985   ................ 324/244

* cited by examiner

*Primary Examiner*—Lynn D. Feild
*Assistant Examiner*—J. F. Duverne
(74) *Attorney, Agent, or Firm*—Michael W. Ferrell

(57) ABSTRACT

Optical polarization maintaining couplers which may be used as a splitter(divider) or a combiner (multiplexer). The couplers utilize a series of partial reflectors disposed in the lightpath between the input fiber and the output fibers. The couplers may be used to form 1 or 2 by N devices with the input and output fibers disposed at right angles to each other forming a compact, efficient polarization maintaining optical coupler.

20 Claims, 2 Drawing Sheets

POLARIZATION MAINTAINING OPTICAL COUPLER

CROSS REFERENCE TO RELATED APPLICATIONS

This application claims the benefit of the filing date of U.S. provisional patent application Serial No. 60/188,877 filed Mar. 13, 2000.

BACKGROUND AND SUMMARY OF THE INVENTION

The present invention is directed to optical components for use in fiber optic networks and particularly to devices known as optical polarization maintaining splitters (dividers) or combiners (multiplexers).

In fiber optical transmission systems the light beams traveling in two or more fibers must often be combined into a single fiber, a device which accomplishes this is called a combiner or multiplexer. Similarly, in such systems one beam must frequently be split into two or more beams, a device which accomplishes this is called a splitter or divider. A splitter or combiner is simply the same device used "in reverse" i.e. when a beam is launched from a single fiber through a coupler the beam will be split into multiple beams and directed to multiple output fibers, if multiple beams are launched from the previous "output" (now input) fibers back through the coupler the beams will be combined into a single beams and directed to the single "input" (now output) fiber as such splitter/combiners may be referred to as an optical "coupler".

A coupler commonly used in fiber optics applications is a "fused coupler" which is made by fusing two or more optical fibers together. These couplers are manufactured by twisting two or more optical fibers together, heating them and then drawing the fibers which fuses the multiple fibers into one. However, these couplers do not maintain polarization, thus rendering them useless for many applications as many of the components in an optical communication system utilize the polarization of the beams to operate. Accordingly, couplers used in such applications must maintain the input polarization as the beams travel through the coupler. Recently a polarization maintaining (1×2) fused coupler has become available, but this device is quite expensive and is not available in other than a 1×2 configuration. Many applications require 1×N PM couplers, which can be made from 1×2 couplers cascaded together, but which would be prohibitively expensive and suffer a penalty in performance due to the cascading of the devices. The present invention is directed to providing multiple port 1×N or 2×N polarization maintaining couplers that are compact, efficient, low loss, high performance in extinction ratio and economical.

A polarization maintaining (PM) fiber optic coupler (1×N or 2×N) is disclosed for use in fiber optic communications. This coupler can be used as a splitter or a combiner of polarized optical signals while maintaining the degree of polarization in both cases. The coupler is based on the use of partial optical reflectors (in predetermined reflectances) in a miniaturized free space format to achieve splitting or combining of polarized optical signals. Lenses are used at the input and output ends to couple the signal into or out of polarization maintaining optical fibers. This approach preserves the degree of polarization of incoming and outgoing optical signals since there are no depolarizing mechanisms in this approach as compared to other approaches including, but not limited to, tree branching in optical waveguides and fused optical fibers.

In this invention, low loss thin film partial optical reflectors (in predetermined reflectances) are used to split or combine polarized optical signals in miniaturized micro optic free space format. The use of partial reflectors in polarization maintaining (PM) couplers is beneficial because partial reflectors do not cause depolarization of polarized light going through them. Accordingly, a relatively large number of ports can be supported in this invention to make a 1×N or 2×N PM coupler with high polarization extinction ratio and no degradation to the extinction ratio of the incoming optical beam. Input lens(es) are used to collimate the incoming beam from the input PM fiber(s) through the reflectors and output lens(es) are used to couple the optical signal into the output PM fiber(s).

The benefits and advantages of optical couplers of the present invention are:
1. A high degree of polarization extinction is achieved and preserved;
2. There is low excess optical loss;
3. There is good uniformity of splitting ratio;
4. These couplers can be extended to unlimited number of ports while preserving a high degree of polarization;
5. Low sensitivity to wavelength;
6. Low sensitivity to temperature;
7. Compact size especially in cases of large number of ports;
8. Can be operated in single polarization format by adding one or more linear polarizers;
9. Can be integrated with an isolator by using a Faraday Rotator film in combination with polarizers;
10. Different fibers for the input/output ports can be used;
11. There is no polarization mode dispersion (PMD); and
12. Similar design and components for configurations from 1×2 to 2×N.

BRIEF DESCRIPTION OF THE DRAWINGS

For a better understanding of the invention, reference is made to the following drawings, which are to be taken in conjunction with the detailed description to follow in which.

DESCRIPTION OF THE PREFERRED EMBODIMENTS

Figure 1:
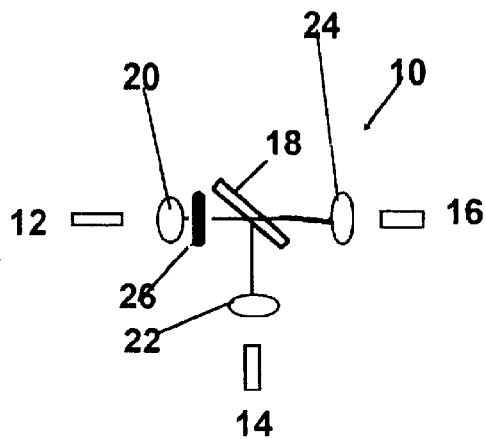
FIG. 1 illustrates a 1×2 coupler utilizing a partial reflector constructed in accordance with the present invention.

A. 1×2 and 2×2 PM couplers (splitters or combiners):

FIG. 1 depicts a 1×2 coupler 10 utilizing a partial reflector in its simplest form constructed in accordance with the present invention. Coupler 10 includes an input fiber 12, two output fibers 14, 16 and a partial reflector 18 with a reflectance of 50%. The partial reflectors in this embodiment and in the embodiments to follow, can be designed for a 45° angle of incidence (AOI) as shown herein, or other angles. Partial reflector 18 has a partially reflecting optical coating (designed for the proper wavelength) on one side of an optically clear substrate (such as glass or fused silica) and an antireflective (AR) coating on the other side to maximize optical transmission. An input lens 20 (which may be of the standard types used in fiber optic applications such as a graded index "GRIN" lens) is used to collimate the incoming beam from input PM fiber 12 through reflector 18 and output lenses 22, 24 are used to couple the optical signal into the output PM fiber 14, 16. A polarizer 26 can be placed between input lens 20 and reflector 18 to make this device suitable for single polarization. Polarizers may also be optionally placed between lenses 22, 24 and reflector 18 or between the fibers and lenses to improve the extinction ratio and/or avoid polarization issues caused by the other optical components.

In operation a light beam is launched from input fiber 12 towards partial reflector 18 wherein 50% of the light impinging thereon will be reflected towards output fiber 14 and 50% of the light will pass through reflector 18 and passes to output fiber 16. In this arrangement only a single partial reflector is used to service two output ports with the output ports disposed at right angles to each other. If having the output ports on a single side and parallel to each other is desired a second 100% reflector could be added after partial reflector 18. For operation as a combiner fibers 14, 16 are used as the input fibers, the beam launched from fiber 16 will pass through reflector 18 (with 50% being reflected away) and impinge on fiber 12 which will now act as the output fiber. The beam launched from fiber 14 will impinge on reflector 18 and 50% of the beam will be directed to fiber 12. For 2×2 operation, a lens and fiber would be aligned with lens 22 and fiber 14 on the other side of reflector 18 (see the discussion below with respect to FIG. 3).

Figure 2:
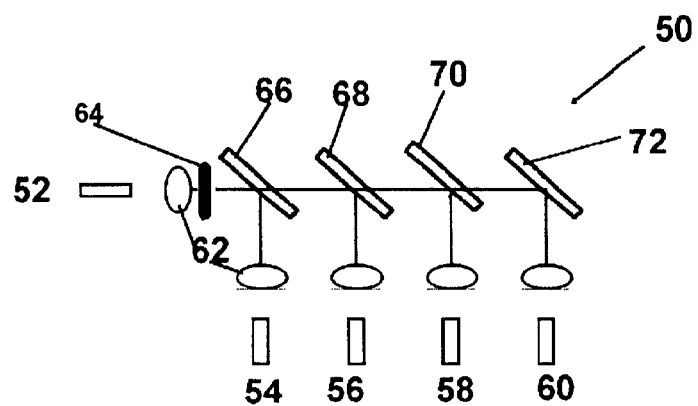
FIG. 2 illustrates a 1×4 coupler constructed in accordance with the present invention utilizing partial reflectors with the output ports arranged on a single side.

B. 1×4 and 2×4 PM couplers (splitters or combiners):

FIG. 2 illustrates a 1×4 coupler 50 constructed in accordance with the present invention utilizing partial reflectors with the output ports arranged on a single side. Coupler 50 includes an input fiber 52 forming an input port and four output fibers 54, 56, 58, 60 with each fiber having an associated collimating lens 62. A polarizer 64 is disposed between lens 62 and reflector 66, polarizers may optionally be disposed between the collimating lenses and the associated reflectors of output fibers 54, 56, 58, 60. Four partial reflectors 66, 68, 70 and 72 with reflectances of 25%, 33.3%, 50%, and 100% respectively, direct a portion of the beam emanating from input fiber 52 to output fibers 54, 56, 58 and 60. The 100% reflector 72 may be omitted if the fourth port 60 is aligned with input fiber 52 rather than the other output fibers. Partial reflectors 66, 68, 70 and 72 have a partial reflecting optical coating (designed for the proper wavelength) on one side of an optically clear substrate (such as glass or fused silica) and antireflective (AR) coating on the second side to maximize optical transmission.

Figure 3:
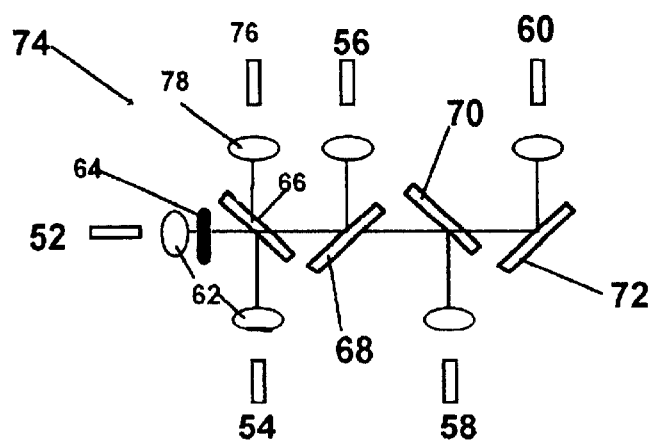
FIG. 3 illustrates a 2×4 coupler constructed in accordance with the present invention utilizing partial reflectors with the output ports arranged on opposed sides.

FIG. 3 illustrates a 1×4 coupler 74 constructed in accordance with the present invention utilizing partial reflectors with the output ports arranged on opposed sides. In this embodiment output fibers 56 and 60 are disposed on the opposite side of output fibers 54 and reflectors 68 and 72 are angled so as to direct the reflected light to these fibers. For operation as a combiner, fibers 54, 56, 58 and 60 are used as the input fibers, the beam launched from these fibers will impinge on partial reflectors 66, 68, 70 and 72 and be directed to fiber 52 which will now act as the output fiber. When the device of either FIG. 2 or FIG. 3 is used as a combiner the partial reflectance of reflectors 66, 68, 70 and 72 operate to provide equal optical energy from each of fibers 54, 56, 58 and 60 to fiber 52. For 2×4 operation, a lens 78 and a fiber 76 are aligned with port 54 on the opposite side of reflector 66. A 2×4 device could also be made with a 50% reflector disposed between polarizer 64 and reflector 66.

C. 1×8 and 2×8 PM couplers (splitters or combiners)

Figure 4:
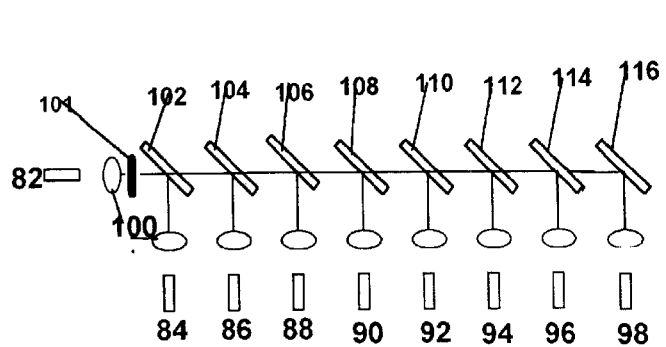
FIG. 4 illustrates a 1×8 coupler constructed in accordance with the present invention utilizing partial reflectors with the output ports arranged on a single side.

FIG. 4 illustrates a 1×8 coupler 80 constructed in accordance with the present invention utilizing partial reflectors with the output ports arranged on a single side. Coupler 80 includes an input fiber 82 forming an input port and eight output fibers 84, 86, 88, 90, 92, 94, 96 and 98 with each fiber having an associated collimating lens 100. A polarizer 101 is disposed between lens 82 and reflector 102, polarizers may optionally be disposed between the collimating lenses and the associated reflectors of output fibers 84, 86, 88, 90, 92, 94, 96 and 98. Eight partial reflectors 102, 104, 106, 108, 110, 112, 114 and 116 with reflectances of 12.5%, 14.3%, 16.7%, 20%, 25%, 33.3%, 50%, and 100% respectively direct a portion of the beam emanating from input fiber 82 to output fibers 84, 86, 88, 90, 92, 94, 96 and 98. The 100% reflector 116 may be omitted if the eighth port 98 is aligned with input fiber 82 rather than the other output fibers. Partial reflectors 102, 104, 106, 108, 110, 112, 114 and 116 may again have a partial reflecting optical coating (designed for the proper wavelength) on one side of an optically clear substrate (such as glass or fused silica) and antireflective (AR) coating on the second side to maximize optical transmission.

Figure 5:
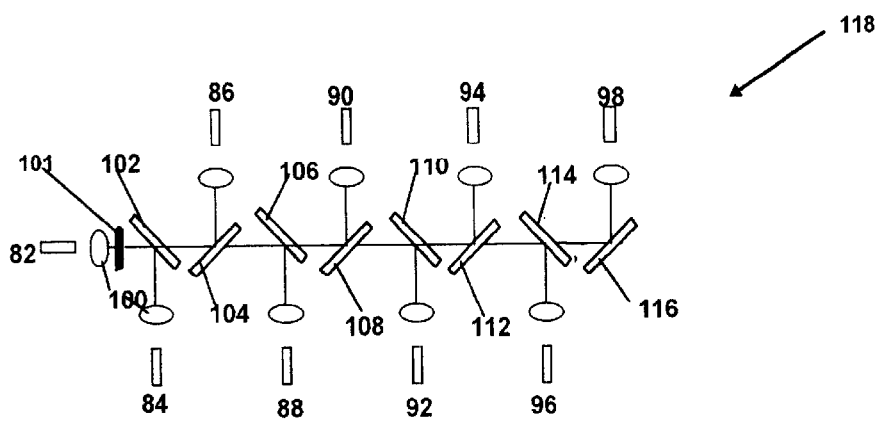
FIG. 5 illustrates a 1×8 coupler constructed in accordance with the present invention utilizing partial reflectors with the output ports arranged on opposed sides.

FIG. 5 illustrates a 1×8 coupler 118 constructed in accordance with the present invention utilizing partial reflectors with the output ports arranged on opposed sides. In this embodiment output fibers 86, 90, 94 and 98 are disposed on the opposite side of output fibers 84, 88, 92 and 98 and reflectors 104, 108, 112 and 116 are angled so as to direct the reflected light to these fibers. For operation as a combiner fibers 84, 86, 88, 90, 92, 94, 96 and 98 are used as the input fibers, the beam launched from these fibers will impinge on partial reflectors 102, 104, 106, 108, 110, 112, 114 and 116 and be directed to fiber 82 which will now act as the output fiber. When the device of either FIG. 4 or FIG. 5 is used as a combiner the partial reflectances of reflectors 102, 104, 106, 108, 110, 112, 114 and 116 operate to provide equal optical energy from each of fibers 84, 86, 88, 90, 92, 94, 96 and 98 to fiber 82. For 2×8 operation, a lens and fiber are aligned with the port 84 facing reflector 102. A 2×8 device could also be made with a 50% reflector disposed between polarizer 101 and reflector 102.

D. 1×N and 2×N PM couplers (splitters or combiners):

From the above examples it is seen that if one of the output ports is aligned with the input port for an N port coupler N−1 partial reflectors are required, if the output ports are to be arranged at an angle to the input port then an additional Nth reflector of 100% reflectivity is added. In the case of 1×N or 2×N PM couplers, N−1 partial reflectors with reflectances of 1/(N−1), 1/(N−2), 1/(N−3), ½ respectively are used. An optional Nth 100% (1/1) reflector may be used on the Nth port to steer the beam on the same side of other ports. These reflectances will provide an equal distribution of power between the input and output ports. However, in certain applications an unequal distribution may be desirable (uneven splitting or combining), in that case differing partial reflectances may be used. The partial reflectors have a partially reflecting optical coating (designed for the proper wavelength) on one side of an optically clear substrate (such as glass or fused silica) and antireflective (AR) coating on the second side to maximize optical transmission. For 2×N operation, a lens and fiber are aligned with the port facing the first reflector or by using an additional 50% reflector. Depending on the requirements of the particular application, the output fibers can be of the single mode type (SM) or polarization maintaining type (PM) with the optical axes conveniently aligned so as to maximize the performance of the device in extinction ratio and insertion loss. The input fibers can be of either the PM or SM type.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A polarization maintaining splitter for splitting an input light beam from an input optical fiber into multiple output beams, said polarization maintaining optical splitter comprising:

a) an input optical fiber;
   b) N output optical fibers;
   c) a beampath being defined between said input fiber and said N optical fibers; and
   d) at least N−1 partial reflectors, said partial reflectors being arranged sequentially in the defined beampath, said partial reflectors directing a portion of the light impinging thereon to one of said N output fibers and passing the remaining portion of the light to the next partial reflector.

2. The polarization maintaining splitter as claimed in claim 1 wherein the reflectances of the partial reflectors are arranged so that equal light intensity is directed to each of the N output fibers.

3. The polarization maintaining splitter as claimed in claim 1 wherein the reflectances of the partial reflectors are arranged in the sequence, with reflectance values of: 1/N, 1/(N−1), 1/(N−2) . . . ½.

4. The polarization maintaining splitter as claimed in claim 1 further including a collimating lens disposed between the input fiber and the first partial reflector.

5. The polarization maintaining splitter as claimed in claim 1 further including a collimating lens disposed between each of the N output fibers and their associated partial reflector.

6. The polarization maintaining splitter as claimed in claim 1 further including a polarizer disposed between the input fiber and the first reflector.

7. The polarization maintaining splitter as claimed in claim 1 further including a polarizer disposed between each of the N output fibers and their associated partial reflector.

8. The polarization maintaining splitter as claimed in claim 1 further including a second input port aligned with the first partial reflector.

9. The polarization maintaining splitter as claimed in claim 1 further including an Nth (100%) reflector.

10. The polarization maintaining splitter as claimed in claim 1 wherein the Output fibers are disposed at right angles to said input fiber.

11. A polarization maintaining combiner for combing multiple input light beams from multiple input optical fibers into a single input beams, said polarization maintaining optical combiner comprising:

a) N input optical fibers;
    b) an output optical fiber;
    c) a beampath being defined between said N input fibers and output optical fiber; and
    d) at least N−1 partial reflectors, said partial reflectors being arranged sequentially in the defined beampath, said partial reflectors directing a portion of the light impinging thereon from said N input fibers to said output fiber.

12. The polarization maintaining combiner as claimed in claim 11 wherein the reflectances of the partial reflectors are arranged so that equal light intensity is from each of the input fibers is directed to the input fiber.

13. The polarization maintaining combiner as claimed in claim 11 wherein the reflectances of the partial reflectors are arranged in the reflectance sequence 1/N, 1/(N−1), 1/(N−2) . . . ½.

14. The polarization maintaining combiner as claimed in claim 11 further including collimating lenses disposed between the input fibers and the partial reflectors.

15. The polarization maintaining combiner as claimed in claim 11 further including a collimating lens disposed between the output fiber and it's associated partial reflector.

16. The polarization maintaining combiner as claimed in claim 11 further including a polarizer disposed between the input fibers and their associated partial reflectors.

17. The polarization maintaining combiner as claimed in claim 11 further including a polarizer disposed between the output fiber and its associated partial reflector.

18. The polarization maintaining combiner as claimed in claim 11 further including a second output port aligned with the first partial reflector.

19. The polarization maintaining combiner as claimed in claim 11 further including an Nth reflector.

20. The polarization maintaining splitter as claimed in claim 11 wherein the input fibers are disposed at right angles to said output fiber.

* * * * *